United States Patent [19]

Fox et al.

[11] Patent Number: 5,276,633

[45] Date of Patent: Jan. 4, 1994

[54] SINE/COSINE GENERATOR AND METHOD

[75] Inventors: James G. Fox, Melbourne Beach; William R. Young; David B. Chester, both of Palm Bay, all of Fla.

[73] Assignee: Harris Corporation, Melbourne, Fla.

[21] Appl. No.: 930,926

[22] Filed: Aug. 14, 1992

[51] Int. Cl.$^5$ ............................................. G06F 1/02
[52] U.S. Cl. .................................................. 364/721
[58] Field of Search ............................. 364/721, 729

[56]       References Cited
      U.S. PATENT DOCUMENTS 5,073,869 12/1991 Bjerede ............................... 364/718
  5,113,361  5/1992 Damerow et al. .................. 364/721

Primary Examiner—Tan V. Mai

Attorney, Agent, or Firm—Ferdinand M. Romano; Charles C. Krawczyk

[57]                 ABSTRACT

A sine/cosine generator with coarse and fine angles having compressed sine and cosine read only memories (ROMS) by use of symmetry of coarse angles about $\pi/4$ and, optionally, symmetry of fine angles about 0. The output of the ROMs directly feed multiplexers for utilization of the compressed storage. Addressing of complementary coarse angles is with one's complementing of the address and of complementary fine angles is with two's commplementing of the address. Fine sines and cosines are stored in recoded version for direct use in multipliers for computations using the sum of angles formulas.

16 Claims, 8 Drawing Sheets

SINE/COSINE GENERATOR AND METHOD

CROSS-REFERENCE TO RELATED APPLICATIONS

The follower applications assigned to the assignee of this application disclose related subject matter Ser. Nos. 07/930,170; 07/930,930; 07/930,169; and 07/930,072, all cofiled with this application.

BACKGROUND AND SUMMARY OF THE INVENTIONS

The present invention relates to electronic devices, and, more particularly, to semiconductor circuits and methods useful in frequency conversion of digital data streams.

Digital Systems with Down Converters

Figure 1:
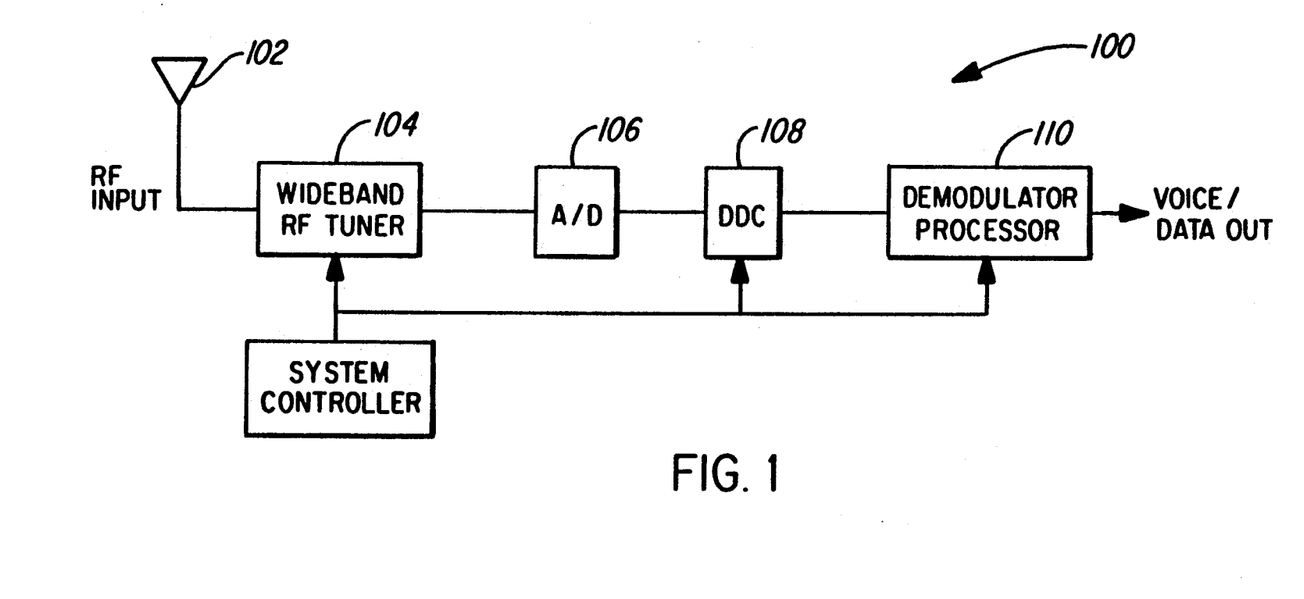
FIG. 1 illustrates an application of a digital down converter.

Communications systems such as broadcast radio use frequency division multiplexing (FDM) to simulaneously transmit differing information signals from several sources in a single locale. Typically, each source modulates its carrier frequency with its information signal and keeps within its allocated frequency band. Extraction of a desired information signal from a received broadband of simultaneous broadcasts may be performed by mixing down (by the selected carrier frequency) followed by lowpass filtering and demodulation as schematically illustrated by system 100 in FIG. 1. Indeed, system 100 receives radio frequency signals (e.g., a broadband of 100–200 MHz) at antenna 102, filters and mixes the signals down to intermediate frequencies (e.g., 1–10 MHz) with a wideband analog tuner 104, converts from analog to digital format with sampling analog-to-digital converter 106, extracts the selected frequency band (e.g., a band of width 15 KHz) with digital down converter 108, and demodulates and reconstructs an analog information signal with demodulator/processor 110. For example, if wideband tuner 104 has a 10 MHz output bandwidth, then analog-to-digital converter 106 will sample at 20 MHz or more (at least the Nyquist rate), and digital down converter 108 will output the selected band at a sampling rate of 30 KHz. That is, digital down converter 108 may decrease the sampling rate due to the small bandwidth of its output without loss of information.

Figure 2:
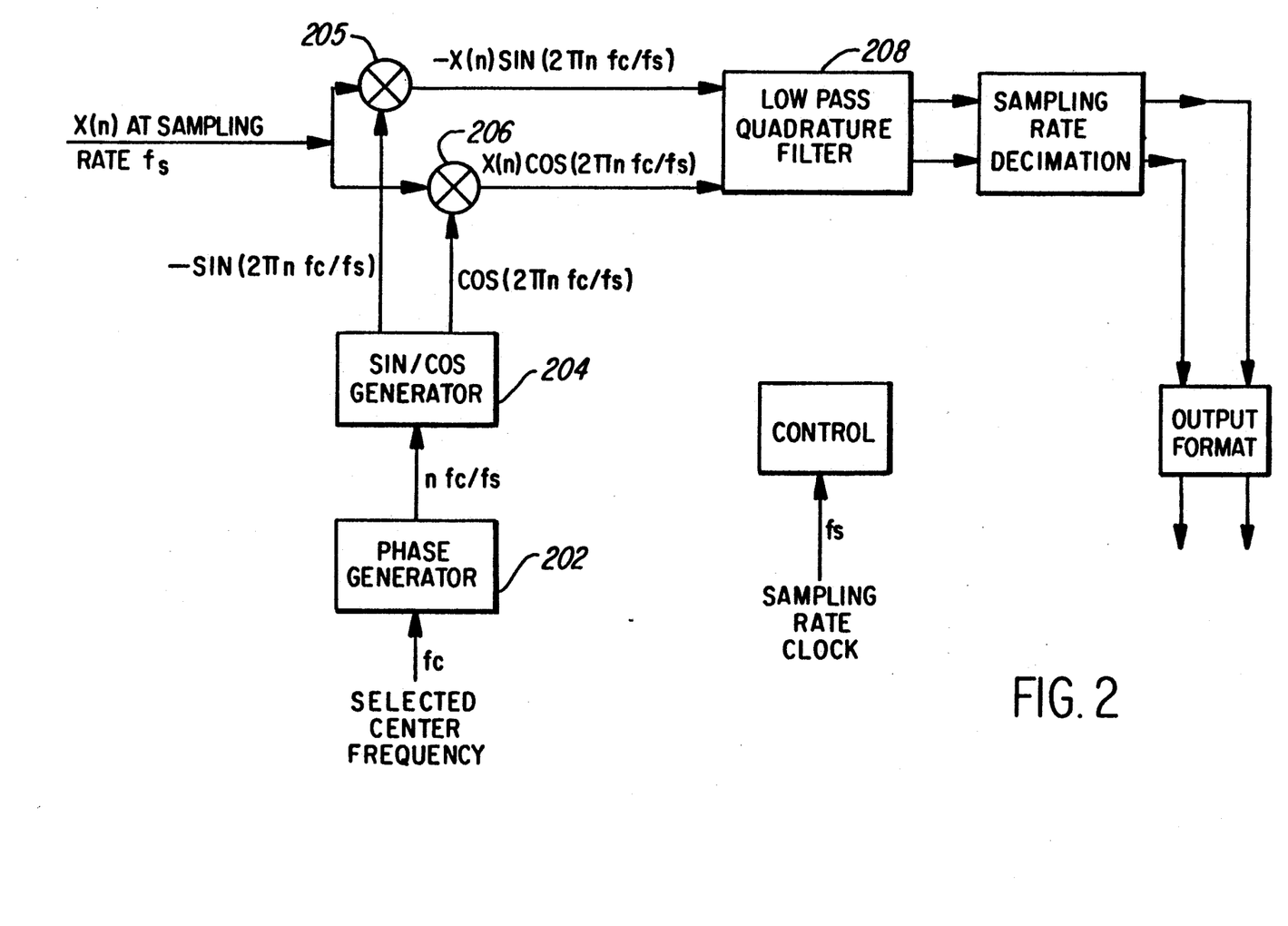
FIG. 2 show functional blocks of a digital down converter including a sin/cos generator.

Digital down converter 108 functionally contains blocks as shown FIG. 2. The phase generator 202, sin/cos generator 204, and multipliers 205-206 mix down the broadband input data stream by the selected band center frequency, and then the lowpass quadrature filter 208 eliminates all bands except the selected band. The input data samples are real numbers, but mixing down is multiplication by a complex exponential and thus generates both real part and imaginary part data streams. That is, for a real data sample stream $x(n)$ [$n = -2, -1, 0, 1, 2, 3 \ldots$] with sampling frequency $f_s$, multiplication by $\cos(2\pi n f_c/f_s)$ and $-\sin(2\pi n f_c/f_s)$ mixes down $x(n)$ by frequency $f_c$ because $\cos(2\pi n f_c/f_s)$ and $-\sin(2\pi n f_c/f_s)$ are the real and imaginary parts of samples of the complex exponential $\exp(-j2\pi f_c t)$ at sampling frequency $f_s$.

Similarly, mixing down by a frequency $-f_c$ will yield equivalent results due to the spectral adjoint symmetry of real data streams. And such mixing by multiplication by sine and cosine is generally termed quadrature modulation.

The problems of construction of system 100 include realizing digital down converter 108 operating at a high sampling frequency while maintaining a low ripple sharp cutoff filter which has programmable down conversion frequency and programmable bandwidth. Known realizations of a down conversion function include the combination of a numerically controlled oscillator/modulator (NCOM) such as the HSP45016 manufactured by Harris Corporation together with two decimating digital filters (one for the in-phase and one for the quadrature outputs of the NCOM) such as the HSP43220 also manufactured by Harris Corporation. A single chip realization such as the GC1011 digital receiver chip manufactured by Graychip, Inc.

Crochiere and Rabiner, Multirate Digital Signal Processing (Prentice-Hall 1983) provides general information regarding signal processing using sampling rate changes and quadrature modulation.

Sin/Cos Generator

The sin/cos generator in FIG. 2 (and in general) takes an input phase (angle) and outputs the sine and cosine of that input angle. Of course, the angle can be restricted to the first quadrant (0 to $\pi/2$) because the sine and the cosine of angles in the other quadrants can be expressed in terms of sines and cosines in the first quadrant. A sin/cos generator could be realized in various ways, for example, as a direct computation of the sine and cosine from a Taylor's series or as a lookup table retrieving stored sine and cosine values from a memory with the input angle determining the memory address for retrieval. Typically, the memory retrieval approach would use read-only memory (ROM) storage of sine and cosine values for all angles in the first quadrant. Further, there is a tradeoff between ROM size and additional arithmetic hardware. This tradeoff arises from expressing the input angle as a sum of a coarse angle plus a fine angle (roughly analogous to expressing a number between 0 and 99 as a multiple of 10 plus a multiple of 1) and using the sum of angles identities for the sine and cosine:

$$\sin(A+B) = \sin(A)\cos(B) + \cos(A)\sin(B)$$

$$\cos(A+B) = \cos(A)\cos(B) - \sin(A)\sin(B)$$

That is, compute the sine and cosine of the input angle in terms of the sines and cosines of the coarse angle and sines and cosines of the fine angle. Hence, only the sines and cosines of the coarse angles and the fine angles need be stored. Of course, the multiplications and additions require additional hardware.

As an example of the ROM size/hardware tradeoff consider 16-bit angle resolution for the interval 0 to $\pi/2$. If every sine and cosine were stored, then $2 \times 2^{16}$ (128K) words would be stored. And if 17-bit accuracy in the stored values were required, then each word is 17 bits and the total ROM capacity needed would be $2 \times 2^{16} \times 17 = 2228224$ bits. This is more than 2 megabits and would occupy a large area of a chip.

But with the expression of an input 16-bit angle as a sum of an 8-bit coarse angle plus an 8-bit fine angle, then only $2 \times 2^8$ coarse angle sines and cosines need be stored along with the $2 \times 2^8$ fine angle sines and cosines. The 256 ($=2^8$) coarse angles would run from 0 to $255\pi/512$ with increments of $\pi/512$. The 256 fine angles would run from 0 to $255\pi/2^{17}$ with increments $\pi/2^{17}$. In this case the total ROM capacity need only be $2 \times 2 \times 2^8 \times 17 = 17408$ bits. Thus the storage capacity can be reduced by a factor of 128 at the cost of multipliers and adders to implement the sum of angles computations.

Such a tradeoff between hardware and ROM size can be found in U.S. Pat No. 5,113,361, issued, May 12, 1992, and assigned to the assignee of the present application. However, ROM size is still a problem and the extra hardware has a problem of complexity and needs simplification.

Features

The present invention provides a sin/cos generator with reduced ROM storage due to symmetric storage including symmetry about $\pi/4$ for the coarse angle and in some embodiments symmetry about 0 for the fine angle.

Storing the cosine of the fine angle in the encoded form requires only 1 or 2 bits plus one additional partial product in the output calculation. This removes the restriction on the fine angle to be such that the rounded value of the cosine of the fine angle be 1 or the use of the approximation that cosine of the fine angle is 1 and allows a more optimized total ROM size. The size of the coarse ROM can be reduced and the fine ROM size increased for a total ROM size reduction.

BRIEF DESCRIPTION OF THE DRAWINGS

The present invention will be described with reference to the accompanying drawings, which are schematic for clarity.

DESCRIPTION OF THE PREFERRED EMBODIMENTS

Overview of Preferred Embodiments

The preferred embodiments provide sin/cos generators using input angle decomposition into a coarse angle A plus a fine angle B together with ROM lookup tables for sin(A), cos(A), sin(B), and cos(B). However, the preferred embodiments compress the sin(A) and cos(A) ROMs by exploiting the complementary symmetry of the sine and cosine in the 0 to $\pi/2$ interval. That is, for coarse angles A in the interval 0 to $\pi/2$, either A is less than $\pi/4$ or $\pi/2-A$ is less than $\pi/4$. Thus the identities $\sin(A)=\cos(\pi/2-A)$ and $\cos(A)=\sin(\pi/2-A)$ reduce the sines and cosines that must be stored to coarse angles in the interval 0 to $\pi/4$, and the preferred embodiment accesses both with a single address. This cuts in half the coarse angle ROM storage requirements at the cost of minimal extra hardware. But as the preferred embodiments show, the ROM savings exceed the extra hardware. Differing preferred embodiments illustrate differing fine angle storage and hardware details.

First Embodiment Architecture

Figures 3, 7:
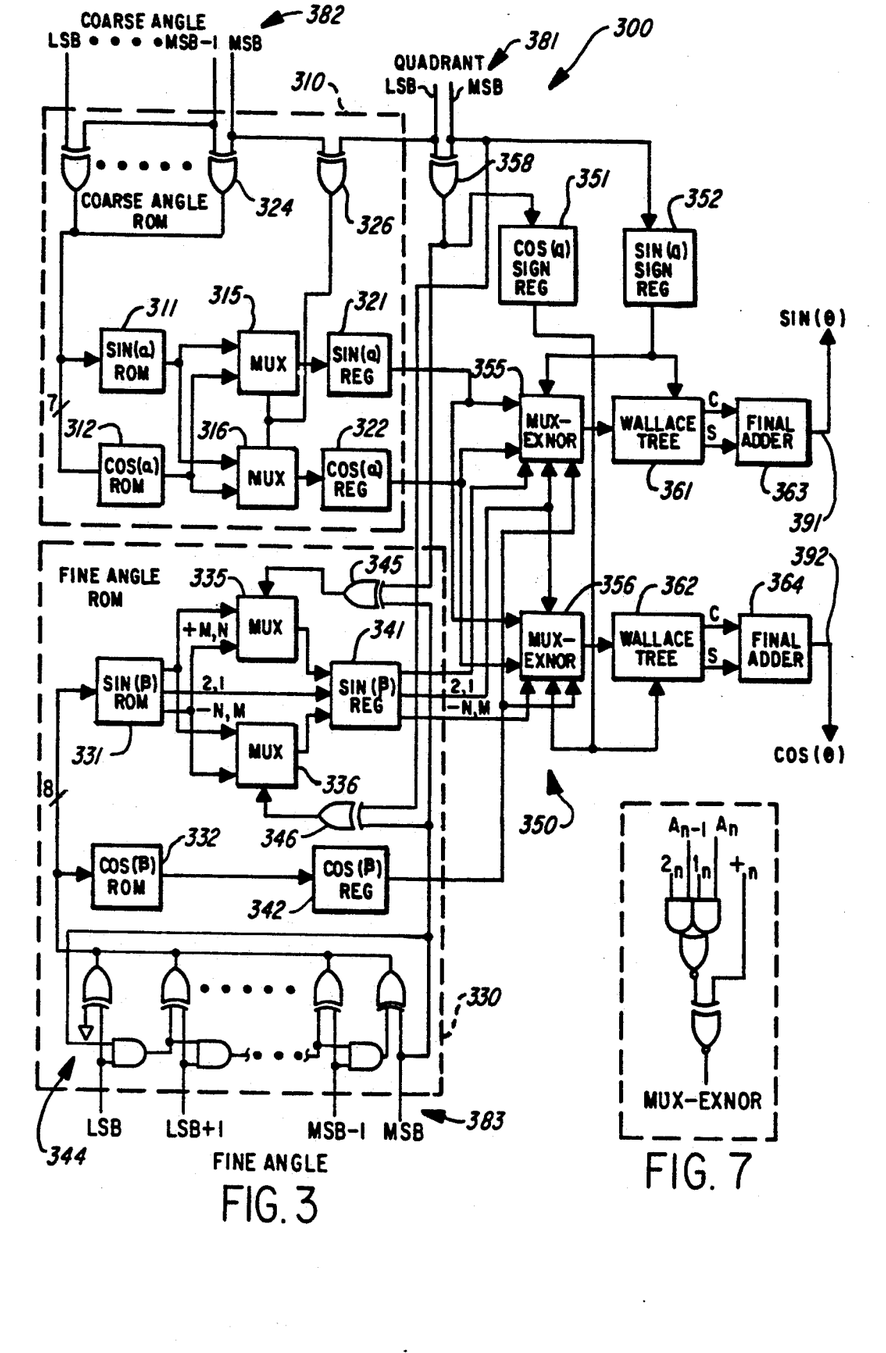
FIG. 3 illustrates first preferred embodiment sin/cos generator in block form.
FIG. 7 shows a multiplexer-exclusive NOR cell of the first preferred embodiment.

FIG. 3 illustrates in schematic functional block form first preferred embodiment sin/cos generator, generally denoted by reference numeral 300. Sin/cos generator 300 uses both the coarse angle complementary reduced ROM and a symmetric about 0 fine angle reduced ROM. In particular, sin/cos generator 300 includes coarse angle ROM 310, fine angle ROM 330, and sum of angles hardware 350, plus input terminal sets 381-383 for the phase word bits encoding the input angle and output terminals 391-392 for the sine and cosine of the input angle. Coarse angle ROM 310 includes coarse sine ROM 311, coarse cosine ROM 312, multiplexers 315-316 for exchanging the sin(A) and cos(A) outputs of ROMs 311-312, coarse sine register 321, coarse cosine register 322, pass/one's complementer 324 for the coarse input phase, and XOR gate 326 for quadrant information input. Coarse sine ROM311 and coarse cosine ROM312 could physically be a single doubleword-wide ROM. Fine angle ROM 330 includes fine sine ROM 331, fine cosine ROM 332, multiplexers 335-336 for sin(B) output selection related to the multiplier-recoded format storage in ROM 331, fine sine register 341, fine cosine register 342, pass/two's complementer 344 for the fine input phase, and XOR gates 345-346 for quadrant information input. Sum of angles hardware includes coarse cosine sign register 351, coarse sine sign register 352, a multiplier-adder for computing sin(A)cos(B)+cos(A)sin(B) made of multiplexer-exclusive NOR array 355 plus Wallace tree 361 and final adder 363, and a multiplier-adder for computing cos(A)cos(B)−sin(A)sin(B) made of multiplexer-exclusive NOR array 356 plus Wallace tree 362 and final adder 364. Sin/cos generator 300 uses a symmetrical fine angle and an offset coarse angle, as will be explained in the discussion of the ROM storage.

An input phase word partitions into two quadrant bits QUADRANT LSB and MSB at inputs 381, coarse angle bits COARSE LSB ... MSB at input 382, and fine angle bits FINE ANGLE LSB ... MSB at input 383. With an N-bit phase word encoding the input angle, an LSB increment of 1 in the phase word corresponds to an input angle increment of $2\pi/2^N$, and overflow in the phase word matches $2\pi$ periodicity in the encoded angle. For example, 18-bit phase words could be partitioned into two quadrant bits (encoding which of the four quadrants contains the input angle), eight coarse bits encoding the coarse angle, and eight fine bits encoding the fine angle. This provides input angle increments of $2\pi/2^{18}$ or about 0.00137 degrees. The operation of sin/cos generator 300 will be analyzed after the storage method for the ROMs has been detailed.

Complementary Coarse Sine and Coarse Cosine ROM Storage

The example of 8-bit coarse phase and 8-bit fine phase will be used for purposes of explanation of the sine and cosine ROM storage of the first preferred embodiment. The precision of the stored values will be 18 or 19 bits for the coarse angles and 17 or 18 bits for the fine angles; the extra bit of coarse angle precision relates to a scale factor for avoidance of saturation when the values are in two's complement format. The leading bits of the fine sine values will be primarily 0s (or 1s if negative and in two's complement format) and the fine cosine values will all be close to 1. Of course, other precisions for the sine and cosine values may be used without change except as to storage size.

Figure 4:
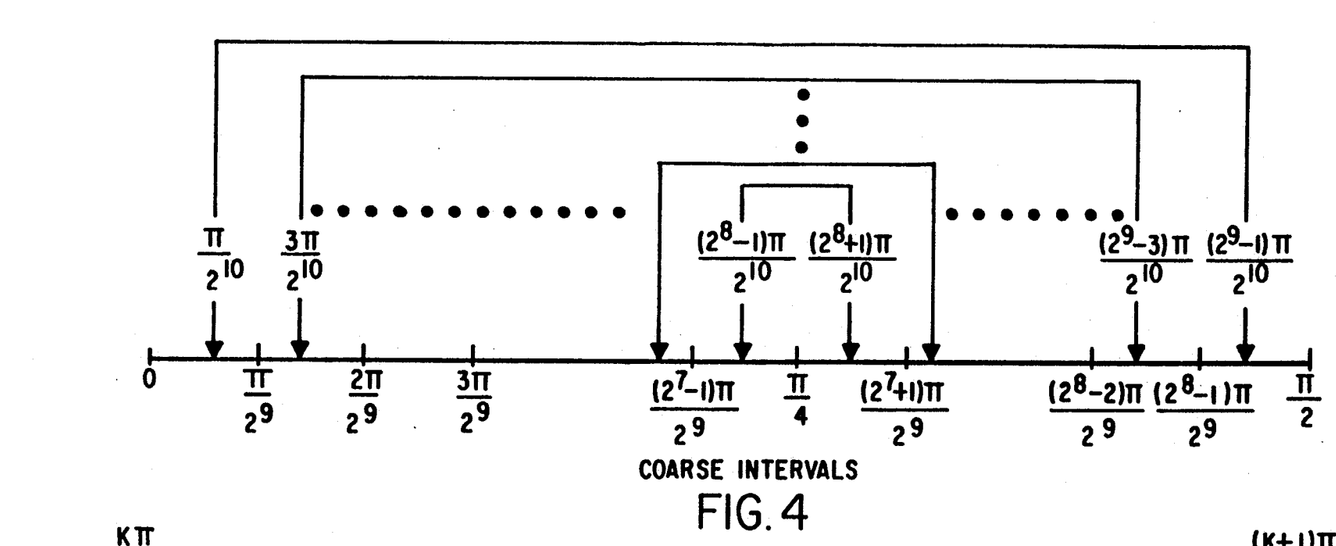
FIG. 4 shows first preferred embodiment coarse angle intervals.

The first quadrant 0 to $\pi/2$ is divided into $2^8$ "coarse" intervals of equal length $\pi/2^9$. Thus the coarse intervals are $[0, \pi/2^9]$, $[\pi/2^9, 2\pi/2^9]$, $[2\pi/2^9, 3\pi/2^9]$, ..., $[(2^8-2)\pi/2^9, (2^8-1)\pi/2^9]$, and $[(2^8-1)\pi/2^9, \pi/2]$ as illustrated in FIG. 4. Each 8-bit coarse phase determines one of these coarse intervals. Now if the coarse interval left endpoints $(0, \pi/2^9, 2\pi/2^9, 3\pi/2^9 \ldots (2^8-2)\pi/2^9, (2^8-1)\pi/2)$ were taken to be the coarse angles whose sines and cosines would be stored in ROM, then the complementary relations $\sin(A)=\cos(\pi/2-A)$ and $\cos(A)=\sin(\pi/2-A)$ could not be fully utilized. In fact, when A equalled 0 or $\pi/4$ the complementary angle would be $\pi/2$ or $\pi/4$, respectively, and thus not a different coarse angle. Consequently, the preferred embodiment coarse angles are taken to be the centers of the coarse intervals, that is, the $2^8$ coarse angles are $\pi/2^{10}$, $3\pi/2^{10}$, $5\pi/2^{10}$ ..., $(2^8-1)\pi/2^{10}$, $(2^8+1)\pi/2^{10}$, ..., $(2^9-3)\pi/2^{10}$, $(2^9-1)\pi/2^{10}$). FIG. 4 shows these coarse angles as pointed to by arrows. Note that this choice of coarse angles excludes both 0 and $\pi/4$ and $\pi/2$. As illustrated by the connecting arrows in FIG. 4, these coarse angles are complementary in that
$\pi/2^{10}+(2^9-1)\pi/2^{10}=\pi/2$,
$3\pi/2^{10}+(2^9-3)\pi/2^{10}=\pi/2$,
   .     .     .
$(2^8-1)\pi/2^{10}+(2^8+1)\pi/2^{10}=\pi/2$. Hence, the complementary relations for sine and cosine apply between pairs of coarse angles. The 8-bit coarse phase encodes a coarse angle as follows:

| 8-bit Coarse Phase | Coarse Angle |
|---|---|
| 0000 0000 | $\pi/2^{10}$ |
| 0000 0001 | $3\pi/2^{10}$ |
| 0000 0010 | $5\pi/2^{10}$ |
| . | . |
| . | . |
| . | . |
| 0111 1111 | $(2^8-1)\pi/2^{10}$ |
| 1000 0000 | $(2^8+1)\pi/2^{10}$ |
| . | . |
| . | . |
| . | . |
| 1111 1101 | $(2^9-5)\pi/2^{10}$ |
| 1111 1110 | $(2^9-3)\pi/2^{10}$ |
| . | . |
| . | . |
| 1111 1111 | $(2^9-1)\pi/2^{10}$ |

Observe that the one's complement of a coarse phase encodes the complement of the original encoded angle. This simplifies the coarse ROM addressing as follows. The sines of the coarse angles less than $\pi/4$ are stored in sine ROM 311 and the cosines of these coarse angles are stored in cosine ROM 312. Thus each ROM needs only seven address bits and the 8-bit coarse phase can be directly used as the address bits by simply ignoring the MSB (which is 0). Then for coarse angles A between $\pi/4$ and $\pi/2$, the 8-bit coarse phase encoding A has a MSB=1, and $\sin(A)$ is to be retrieved from cosine ROM 312 by using $\sin(A)=\cos(\pi/2-A)$. But as noted, the 8-bit coarse phase encoding the angle $\pi/2-A$ is simply the one's complement of the 8-bit coarse phase encoding A. Thus to retrieve $\sin(A)$ take the one's complement of the 8-bit coarse phase encoding A and apply this one's complement (which has MSB=0) as the address to cosine ROM 312. Similarly for $\cos(A)$ use the 8-bit coarse phase as address for cosine ROM 312 if the phase MSB=0 and take the one's complement of the 8-bit coarse phase as address for sine ROM 311 if the phase MSB=1. Hence, the coarse ROMs 311-312 need only be one half the size of ROMs which store the sines and cosines for an entire quadrant of coarse angles. The hardware cost for this compression of the storage is a one's complement and multiplexer (to switch between sine ROM 311 cosine ROM 312) if MSB=1. In FIG. 3 the upper lefthand portion shows the coarse phase MSB feeding exclusive OR (XOR) gates of pass/one's complementer 324 on each of the other seven bits of the coarse phase inputs 382. This provides a pass through if MSB=0 and a one's complement if MSB=1. These seven bits are addresses for sine ROM 311 and cosine ROM 312 which output to multiplexers 315-316 driven by the MSB through XOR gate 326 (to account for quadrant encoding which leads to further complementing). Note that all of the stored sines and cosines are positive numbers because 0 is not a coarse angle.

Alternatively, the coarse angles need not be the centers of the coarse intervals, but could be shifted within the intervals provided the shift for an angle less than $\pi/4$ is the complement of the shift of its complementary angle. Such noncentered coarse angles lead to more involved fine angle encoding because the required fine angle range would not be the same for all coarse intervals.

Symmetrical Fine Sine and Cosine ROM Storage

Figure 5:
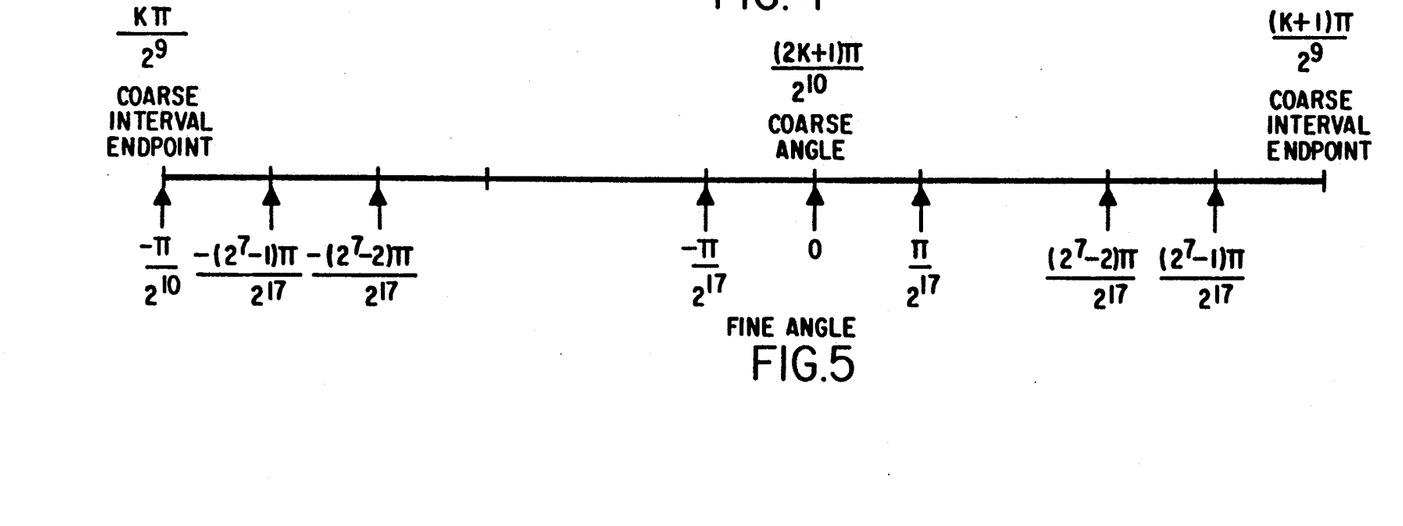
FIG. 5 shows first preferred embodiment fine angles.

Each coarse interval (which has length $\pi/2^9$) is divided into $2^8$ "fine" subintervals of equal length $\pi/2^{17}$. Each 8-bit fine phase determines one of these fine subintervals and a total angle (coarse angle plus fine angle) in the (closed) subinterval. Because each coarse angle is the center of its coarse interval, the fine angles are taken to include negative values so that an 8-bit fine phase 0000 0000 determines the left endpoint (smallest total angle) of the corresponding coarse interval. That is, the fine angles are $-2^7/2^{17}(=-\pi/2^{10})$, $-(2^7-1)\pi/2^{17}, -(2^7-2)\pi/2^{17}, -(2^7-3)\pi/2^{17}, \ldots$, $-\pi/2^{17}, 0, \pi/2^{17}, \ldots (2^7-2)\pi/2^{17}, (2^7-1)\pi/2^{17}$. FIG. 5 illustrates the fine angles in a coarse interval. The 8-bit fine phase encodes the fine angles as follows.

| 8-bit Fine Phase | Fine Angle |
|---|---|
| 0000 0000 | $-2^7\pi/2^{17}$ |
| 0000 0001 | $-(2^7-1)\pi/2^{17}$ |
| 0000 0010 | $-(2^7-2)\pi/2^{17}$ |
| . | . |
| . | . |
| . | . |
| 0111 1111 | $-\pi/2^{17}$ |
| 1000 0000 | 0 |
| 1000 0001 | $\pi/2^{17}$ |
| . | . |
| . | . |
| 1111 1101 | $(2^7-3)\pi/2^{17}$ |
| 1111 1110 | $(2^7-2)\pi/2^{17}$ |
| 1111 1111 | $(2^7-1)\pi/2^{17}$ |

This assignment of fine angles implies that the full 16-bit phase of 000 ... 000 does encode the total angle 0 because the coarse angle will be $\pi/2^{10}$ and the fine angle will be $-\pi/2^{10}$ so they add to 0. Likewise, the 16-bit phase 111 ... 111 encodes $\pi/2-\pi/2^{17}$, which is the largest angle in the first quadrant because $\pi/2$ will be considered the start of the second quadrant.

Observe that the two's complement of an 8-bit fine phase encodes the negative of the originally encoded fine angle, except for the special cases of phases 0000 0000 and 1000 0000. This two's complement relationship simplifies the addressing hardware because sine ROM 331 takes advantage of $\sin(-B) = -\sin(B)$ to store only one half of the fine angle sines. Similarly, $\cos(-B) = \cos(B)$, so cosine ROM 332 also need only store one half of the fine angle cosines. In particular, ROMs 331 and 332 are designed as fully decoded $2^8$ word memories with only $2^7$ words implemented. The addressing is two's complement addressing with the MSB functioning as the two's complement command and only the addresses 0000 0000 through 0111 1111 implemented. Note that this corresponds to negative fine angles. When the address 1000 0000 (corresponding to fine angle equal to 0) is sent to the ROMS, its two's complement will be formed because the MSB=1 and this regenerates nonimplemented address 1000 0000. This address will not select any word line and the default ROM output will occur. The default ROM output can be established by design of the ROMs to be any desired pattern of 0s and 1s. Thus the sine ROM 331 default output will be 0 and the cosine ROM 332 default output will be 1. Alternatively, the 8th address bit could be implemented and a 129 word ROM used.

The cosine of a small angle is close to 1, so cosine ROM 332 only has a few values, depending upon the precision in cos(B) needed. The use of fine angles which may be positive or negative has two effects: first, it cuts the size of the sine and cosine ROMs in half because of the fact that sine is an odd function and the cosine is an even function, and second, it cuts the maximum amplitude of the fine angle in half which implies better approximations for cos(B). Indeed, $\cos(B) = 1 - B^2/2 + \ldots$ for B expressed in radians, so a maximum amplitude of B as $\pi/2^{10}$ implies cos(B) differs from 1 by at most about $10/2^{21}$ which lies between $2^{-18}$ and $2^{-17}$. This means for 18-bit magnitude precision cos(B) can be stored as just two bits; the two bits determine a number D to be one of 0, $2^{-18}$, or $2^{17}$ and $\cos(B) = 1 - D$. Contrarily, if only positive fine angles were used, then the maximum B would be twice as large at $\pi/2^9$ and cos(B) would differ from 1 by up to about $10/2^{19}$ which lies between $2^{-16}$ and $2^{-15}$. This would require four bits to encode D. However, sin/cos generator 300 outputs 17-bit two's complement values, thus only the equivalent of 18 signed bits need be stored in the ROMs 331 and 332, and thus only one bit is needed to encode D in the symmetric fine angle case if the values are restricted to 0 and $2^{-17}$.

Quadrant Encoding

Input 18-bit phase words encode angles in the range 0 to $2\pi$, including 0 and excluding $2\pi$. A phase word is partitioned as follows: the two most significant bits encode the quadrant of the encoded angle, the next 8 bits encode a coarse angle A in the first quadrant, and the least significant 8 bits encode a small fine angle B. Each increment by 1 in the LSB of the phase word increments the encoded angle by $2\pi/2^{18}$. The first quadrant is the range 0 to $\pi/2$, including 0 and excluding $\pi/2$; similarly the second quadrant is the range $\pi/2$ to $\pi$, including $\pi/2$ and excluding $\pi$; and so forth.

The values of sine and cosine in the first quadrant determine the values in the other three quadrants by the identities $\sin(X + \pi/2) = \cos(X)$, $\cos(X + \pi/2) = -\sin(X)$, $\sin(X + \pi) = -\sin(X)$, $\cos(X + \pi) = -\cos(X)$, and $\sin(X + 3\pi/2) = -\cos(X)$, $\cos(X + 3\pi/2) = \sin(X)$ where X is in the first quadrant and will equal A+B. With the multiple $q\pi/2$ to get into a quadrant (so q is just the binary number equal to the phase word most significant two bits), QUADRANT MSB and QUADRANT LSB at terminals 381 in FIG. 3 encode the quadrant and the sines and cosines are as follows.

| Quadrant | MSB | LSB | $\sin(X + q\pi/2)$ | $\cos(X + q\pi/2)$ |
|---|---|---|---|---|
| I | 0 | 0 | $+\sin(X)$ | $+\cos(X)$ |
| II | 0 | 1 | $+\cos(X)$ | $-\sin(X)$ |
| III | 1 | 0 | $-\sin(X)$ | $-\cos(X)$ |
| IV | 1 | 1 | $-\cos(X)$ | $+\sin(X)$ |

Thus the MSB determines the sign of sine and directly feeds sine sign register 352. The XOR of the MSB and the LSB determines the sign of cosine, and XOR gate 358 supplies it to cosine sign register 351. These registers directly feed the multiplier-adders (multiplexers plus Wallace tree plus final adder). Further, when the LSB equals 1, the sine and cosine are interchanged.

Figure 6:
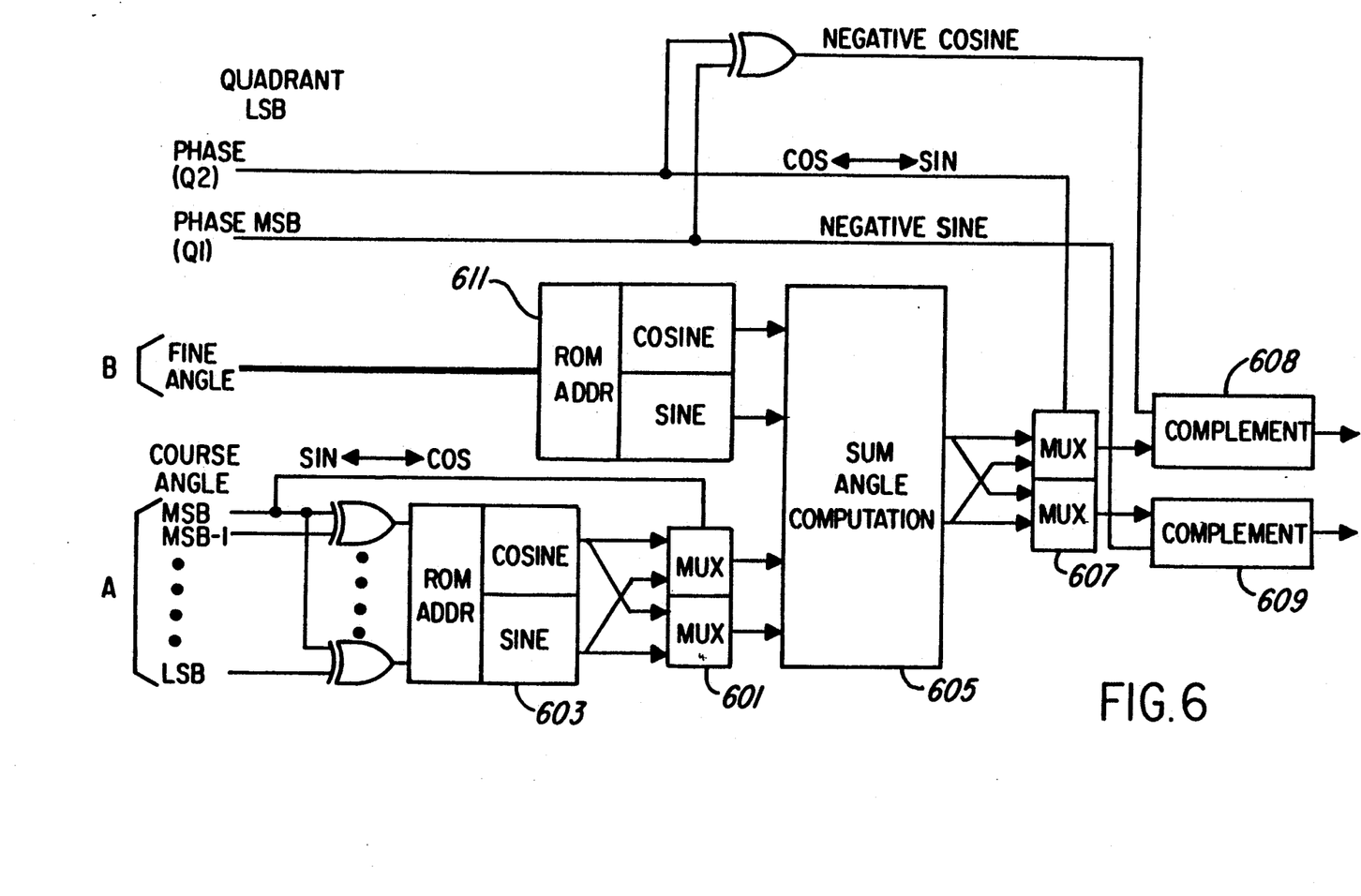
FIG. 6 is a functional block daigram of the first preferred embodiment.

FIG. 6 shows the overall relations, including the coarse angle switching (multiplexers 601) of sine and cosine which goes with the half-quadrant-only storage 603 of sines and cosines. The "Sum Angle Computation" block 605 performs the computations of $\sin(X) = \sin(A + B) = \sin(A)\cos(B) + \cos(A)\sin(B)$ and $\cos(X) = \cos(A + B) = \cos(A)\cos(B) - \sin(A)\sin(B)$, and the multiplexers 607 and complementers 608-609 on the righthand side of FIG. 6 perform the quadrant sign and sine/cosine interchanges in the foregoing table. Note that any multiplier and adder could be used, but the embodiment of FIG. 3 uses a multiplier with recoded sin(B) and cos(B) values in ROM 611 to reduce the number of partial products in the multiplications plus Wallace trees for adding the partial products.

Operation

The overall operation of sin/cos generator 300 can be most easily explained by the following tables which show the net effect of the two quadrant bits, the coarse phase MSB and the fine phase MSB on the computation of the output sine and the computation of the output cosine. In particular, the 18-bit input phase word determines the angle $A + B + q\pi/2$ where q is the binary number made of the two quadrant bits, A is the coarse angle (positive), and B is the fine angle (positive or negative). However, the coarse sines and cosines have only been stored for half of the coarse angles (angles A between 0 and $\pi/4$ where coarse phase MSB=0) and the fine sines and cosines have been stored only for half of the fine angles (negative angles B where fine phase MSB=0), so this requires hardware to invoke trigonometric operations as follows:

| Quad MSB LSB | Coarse MSB | Fine MSB | $\sin(A + B + q\pi/2)$ |
|---|---|---|---|
| 00 | 0 | 0 | $\sin(A)\cos(B) + \cos(A)\sin(B)$ |
| 00 | 0 | 1 | $\sin(A)\cos(-B) - \cos(A)\sin(-B)$ |
| 00 | 1 | 0 | $\cos(\pi/2 - A)\cos(B) + \sin(\pi/2 - A)\sin(B)$ |
| 00 | 1 | 1 | $\cos(\pi/2 - A)\cos(-B) - \sin(\pi/2 - A)\sin(-B)$ |
| 01 | 0 | 0 | $\cos(A)\cos(B) - \sin(A)\sin(B)$ |
| 01 | 0 | 1 | $\cos(A)\cos(-B) + \sin(A)\sin(-B)$ |
| 01 | 1 | 0 | $\sin(\pi/2 - A)\cos(B) -$ |

| | | | -continued |
|---|---|---|---|
| 01 | 1 | 1 | $\cos(\pi/2 - A)\sin(B)$ $\sin(\pi/2 - A)\cos(-B) +$ $\cos(\pi/2 - A)\sin(-B)$ |
| 10 | 0 | 0 | $-\sin(A)\cos(B) - \cos(A)\sin(B)$ |
| 10 | 0 | 1 | $-\sin(A)\cos(-B) + \cos(A)\sin(-B)$ |
| 10 | 1 | 0 | ... |
| . | . | . | |
| . | . | . | |
| . | . | . | |

| Quad MSB LSB | Coarse MSB | Fine MSB | $\cos(A + B + q\pi/2)$ |
|---|---|---|---|
| 00 | 0 | 0 | $\cos(A)\cos(B) - \sin(A)\sin(B)$ |
| 00 | 0 | 1 | $\cos(A)\cos(-B) + \sin(A)\sin(-B)$ |
| 00 | 1 | 0 | $\sin(\pi/2 - A)\cos(B) -$ $\cos(\pi/2 - A)\sin(B)$ |
| 00 | 1 | 1 | $\sin(\pi/2 - A)\cos(-B) +$ $\cos(\pi/2 - A)\sin(-B)$ |
| 01 | 0 | 0 | $-\sin(A)\cos(B) - \cos(A)\sin(B)$ |
| 01 | 0 | 1 | $-\sin(A)\cos(-B) + \cos(A)\sin(-B)$ |
| 01 | 1 | 0 | $-\cos(\pi/2 - A)\cos(B) -$ $\sin(\pi/2 - A)\sin(B)$ |
| 01 | 1 | 1 | $-\cos(\pi/2 - A)\cos(-B) +$ $\sin(\pi/2 - A)\sin(-B)$ |
| 10 | 0 | 0 | $-\cos(A)\cos(B) + \sin(A)\sin(B)$ |
| 10 | 0 | 1 | $-\cos(A)\cos(-B) - \sin(A)\sin(-B)$ |
| 10 | 1 | 0 | ... |
| . | | | |
| . | | | |

Each of the terms in the righthand column is stored, so the hardware in sin/cos generator 300 uses the four bits to retrieve the proper stored values and generate the proper signs. In particular, the coarse phase MSB and fine phase MSB control complementing of the coarse and fine ROM addresses, respectively. The exclusive OR of the quadrant LSB with the coarse phase MSB performs the coarse sine/cosine interchange. The quadrant bits determine signs of the sine and cosine of the coarse angle, respectively. The exclusive OR of the exclusive OR of the quadrant LSB and MSB and quadrant MSB, respectively, with the fine phase MSB performs the negation of the fine angle sine for use in computing the total angle sine and cosine.

Further, the fine sines and cosines have been stored as recoded versions to be used in Booth-algorithm type multipliers, and Wallace trees have been used to add the partial products. This means that the multiplications such as sin(A)cos(B) and cos(A)sin(B) are recast as multiplexed shifts of sin(A) from coarse sine register 321 and of cos(A) from coarse cosine register 322 which are simultaneously added in a Wallace tree. The recoded sin(B) and cos(B) control the multiplexing and shifting. Consequently, a brief discussion of Booth-type recoding multipliers and Wallace trees will be presented.

First consider an example of multiplication of a 17-bit multiplicand (the coarse sine or cosine) by a 16-bit multiplier (the fine sine or cosine). Written out, this product is seen to be the sum of easily-generated partial products. For example, the multiplication of 11110000111100001 by 0101010101011101 is:

```
          11110000111100001
     X    0101010101011101
          11110000111100001
          00000 ... 00000
          111100 ... 100001
          111100 ... 100001
               ...
               ...
    111100 ... 100001
```

$\pm$ 00000 ... 00000

Clearly, each partial product may be generated by merely shifting the multiplicand for a corresponding 1 in the multiplier and is simply 0 for a corresponding 0 in the multiplier. If these numbers are in two's complement format, then sign extension bits would be added to extend the leading 1's in negative partial products out to the sign bit position. The summing of the 16 partial products consumes the bulk of the multiplication time. The summing of the partial products may be accelerated in two independent ways: the summing may be done in a Wallace tree plus final adder (see FIG. 3) and the multiplier may be recoded to reduce the number of partial products by use of a Booth-type algorithm. Sin/cos generator 300 uses both Wallace trees 361 and 362 and recodes the multipliers (the fine sine and the fine cosine) as illustrated in FIG. 3 with arrays 355 and 356 performing the shifting pursuant to the recoded multipliers. FIG. 7 schematically shows a single cell of arrays 355 or 356. Each cell outputs a bit to the Wallace tree that comes from the sum of the two partial products which correspond to the pair of bits recoded. Thus with 18-bit coarse sines and cosines plus fine sines of roughly ten significant bits and fine cosines a 2-bit difference from 1, each array 355 or 356 must include at least 133 ($19 \times 7$) cells. Further, the two's complement format for negative numbers generates sign extension bits in the partial products and consequently more cells.

Figure 9:
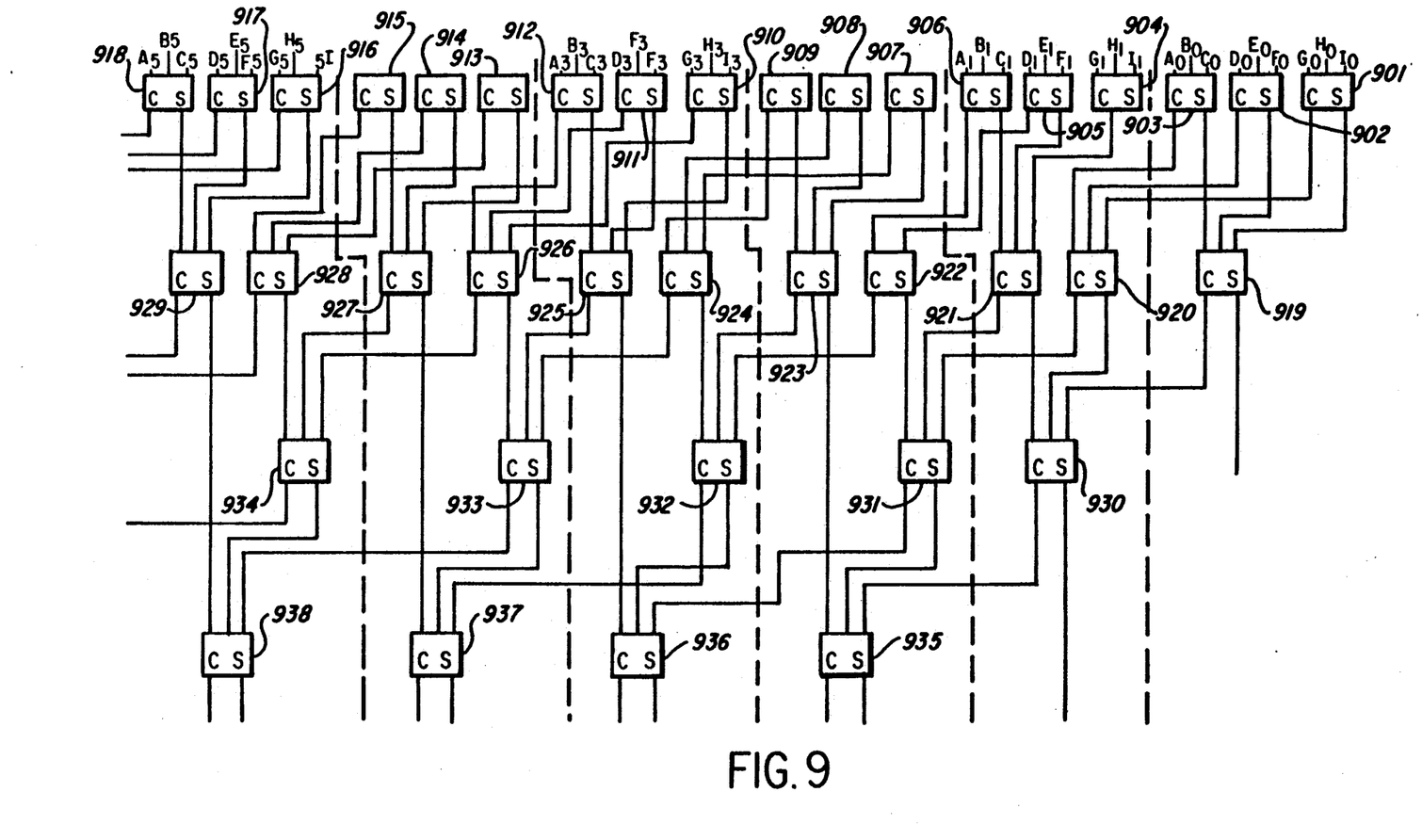
FIG. 9 shows a Wallace tree.

Typically, a Wallace tree consists of an array of full adders (carry save adders) which have three inputs and two outputs (the sum bit plus the carry out to higher order bits). Hence, each layer of a Wallace tree roughly reduces the number of terms by a factor of 3 to 2. FIG. 9 shows a Wallace tree for adding nine numbers called A, B, C, ... H, and I with a subscript indicating bit order. For sin/cos generator 300 these inputs are multiple shifted and possibly-negated versions of the words in coarse sine register 321 and coarse cosine register 322. Of course, the shifting and negation comes from arrays 355 and 356. The rectangles indicate the adders 901-938 and the broken vertical lines group bits of the same order with the least significant bits on the right. Note that every carry out goes into the adjacent grouping to the left. As indicated by FIG. 9, after four levels the nine numbers have been added to form at most one sum bit and one carry bit in each bit position. The regularity of the tree is apparent in the lefthand portion of FIG. 9. These sum and carry bits are added in a final adder as shown by adders 363 and 364 in FIG. 3.

Recoding a multiplier to lessen the number of partial products may be done in various ways including the straightforward approach of grouping the multiplier bits in pairs to add the partial products in pairs prior to summing in a Wallace tree or other adder. In more detail, if a pair of bits of a multiplier is 00, then the sum of the partial products they generate is simply 0. Similarly, pairs 01 and 10 generate a pair of partial products with a trivially performed sum. The case of a pair 11 differs and requires a summing of the two partial products or the generation of 3 times the multiplicand. However, if the pair 11 (which represents 3) is rewritten as 100−01 (which is 4−1) and the 100 treated as a carry into the next more significant bit pair, then the sum of the two partial products has again been reduced to one partial product. This process of eliminating a sum with a carry can be made consistent as shown in the following table: the first column is a bit pair, the next column is a carry in from the adjacent less significant bit pair, the third column is the carry out to the adjacent more significant bit pair, and the righthand column is the recoded bit pair which has no 11 terms and thus no sum. Note that a −01 bit pair means that the multiplicand is two's complemented for negation and that a −10 bit pair means that the mulitplicand is multiplied by 2 (shifted left 1 bit) and then two's complemented:

| Original Bit Pair | Carry in | Carry out | Recoded Bit Pair |
|---|---|---|---|
| 00 | 0 | 0 | 00 |
| 00 | 1 | 0 | 01 |
| 01 | 0 | 0 | 01 |
| 01 | 1 | 0 | 10 |
| 10 | 0 | 1 | −10 |
| 10 | 1 | 1 | −01 |
| 11 | 0 | 1 | −01 |
| 11 | 1 | 1 | 00 |

Thus the summing in pairs of the partial products may be accomplished with the foregoing recoding which requires extra hardware for the two's complementing negations. Of course, each partial product must have sign extension bits if it is negative, or some equivalent.

Sin/cos generator 300 uses a more sophisticated recoding of the fine sine in that the recoded bit pair sign is replaced by two terms, "+" and "−", which will adjust for the sign difference of the sin(B) terms in the sine and cosine sum of angles formulas. That is, with positive angles cos(A+B) still has a subtraction. The recoding of an original bit pair also depends upon the original next more significant bit pair in the 10 original bit pair case as follows:

| Original Bit Pair | Carry in | Original next more significant | Recoded Bit Pair | Carry out | "+" | "−" |
|---|---|---|---|---|---|---|
| 00 | 0 | ** | 00 | 0 | 0 | 0 |
| 00 | 1 | ** | 01 | 0 | 0 | 1 |
| 01 | 0 | ** | 01 | 0 | 0 | 1 |
| 01 | 1 | ** | 10 | 0 | 0 | 1 |
| 10 | 0 | *0/0* | 10 | 0 | 0 | 1 |
| 10 | 0 | 11 | 10 | 1 | 1 | 0 |
| 10 | 1 | ** | 01 | 1 | 1 | 0 |
| 11 | 0 | ** | 01 | 1 | 1 | 0 |
| 11 | 1 | ** | 00 | 1 | 0 | 0 |

Note that * indicates don't care

FIG. 3 shows the recoded bit pair as labeled "2,1" and loading straight from fine sine ROM 331 into fine sine register 341 and then feeding multiplexer arrays 355 and 356. The "2,1" labelling just reflects the recoded bit pair's multiplication magnitude. Multiplexer 336 selects between "+" and "−" from fine sine ROM 331 and feeds this to fine sine register 341 and then to array 356 for the cosine output computation. The XOR of the fine phase MSB and the quadrant MSB drives multiplexer 336, and with an input 1 multiplexer 336 selects the "−" recoding due to the subtraction in the formula for cos-(A+B). Similarly, multiplexer 335 selects between "+" and "−" from fine sine ROM 331 and feeds this to fine sine register 341 and then to array 355 for the sine output computation. The XOR of fine phase MSB and XOR (Quadrant MSB, Quadrant LSB) drives multiplexer 335. With a 1 input, multiplexer 335 will select the "+" recoding due to the addition in the formula for sin(A+B)

FIG. 7 shows the structure of a cell of arrays 355 and 356 with the recoded pair as the "2" and "1" inputs, two bits from the multiplicand as "$A_{N-1}$" and "$A_N$" inputs, and the "+" input from fine sine register 341. $A_{N-1}$ and $A_N$ correspond to adjacent bits within two partial products. The "+" input will receive either the "+" or the "−" output from fine sine ROM 331. Note that a 00 input for "2" and "1" will output a 0 because the "+" input is always 0 due to both "+" and "−" from fine sine register 341 being 0; see the first line in the foregoing table. With the 01 and 10 inputs for "2" and "1", the "+" input just determines the sign of the output.

For example, with an angle in the first quadrant, multiplexers 335 and 336 will both be driven by the fine phase MSB because the quadrant MSB and LSB provide 0s to XORs 345 and 346. Consider a fine phase MSB=0; this corresponds to a negative fine angle. Then multiplexer 336 will pass the "−" recoding to fine sine register 341 and then onto array 356 for cosine output computation, and multiplexer 335 will pass the "+" recoding to fine sine register 341 and onto array 355 for sine output computation. This implies no negation in the partial products corresponding to −sin(A)sin(B) in the cosine output computation because sin(B) is negative and sin(A) positive; and negation in the partial products corresponding to +cos(A)sin(B) in the sine output computation. Conversely, if fine phase MSB=1 to encode a nonnegative angle, multiplexers 335 and 336 will switch and multiplexer 336 will pass "+" and multiplexer 335 will pass the "−" recoding to fine sine register 341 and then onto arrays 355–356. This corresponds to terms +sin(A)sin(−B) in the cosine output and −cos(A)sin(−B) for the sine output, respectively.

Sign Extension

The multiplication cos(A)sin(−B) generates negative partial products, and thus each partial product in two's complement format needs sign extension bits. All of the sign extension bits can be added together to form a sign extension word. The following simple example of multiplication of −26 by 13 without recoding the multiplier and with each factor in 8-bit two's complement format illustrates the idea of sign extension word construction. The partial products are:

```
  11100110      −26
X 00001101       13
  11100110
 11100110
11100110
```

Now the product of two 8-bit two's complement format numbers will be 16-bit two's complement format. Thus each of the nonzero partial products (each of which is negative) must be recast in 16-bit format by extending each partial product's sign bit out to and including the sign bit in the 16th bit position in order to establish the partial product as a negative number. Thus the multiplication becomes:

```
         11100110      −26
X        00001101       13
1111111111100110
111111111100110
```

-continued

```
  1111111100110
1111111010101110    −338
```

All of the sign extension bits introduced may be added together form a sign extension word which can be added into the original partial product sum for the case of a negative multiplicand (and positive multiplier).

Recoding the multiplier to reduce the number of partial products still permits accumulation of all of the partial product sign extension bits into a sign extension word although different partial products may have different signs due to the recoded multiplier including both positive and negative recoded bit pairs. In particular, the recodings previously discussed illustrate both positive and negative recoded bit pairs. Then the sign for a partial product is taken to be the exclusive OR of the sign of the multiplicand and the sign of the corresponding recoded bit pair of the multiplier (e.g., +=1 in the foregoing recoding table for a negative recoded bit pair if the multiplier is not zero or zero if the multipler is zero. And the sum of these partial product signs (in bit positions corresponding to their partial products) is then two's complemented to form the sign extension word. Copending U.S. patent application Ser. No. 07/434,798, filed Nov. 13, 1989 naming Young and Malinowski as inventors, and assigned to the assignee of the present application, more fully describes this sign extension word construction and is hereby incorporated by reference.

Sin/cos generator 300 always has terms like cos(A)·sin(−B) added to terms like sin(A)cos(−B). Thus there may be both a sign extension word from the fine angle sine multiplication and a sign extension word from the fine angle cosine multiplication, and these sign extension words may need to be added. As previously discussed, cos(−B) almost equals one and is taken to be 1−D where D may be encoded by a single bit for the 17-bit precision with symmetric fine angles of the first preferred embodiment. Thus multiplication by cos(−B) is multiplication by 1 (no operation) plus a multiplication by −D. And the multiplication by −D has only one partial product. The sign bit for the single partial product of multiplier D will either align with the LSB of the sign extension word of the partial products from the recoded sin(−B) multiplication or align one bit to the right (one bit less significant) of the ISB of the sign extension word, depending upon how the least significant bit pair recodes. Consider these two bit alignment cases separately.

The first case is the LSB of the sign extension word aligning with the sign bit of the multiplication by D partial product. Let SX denote the sign bit and the remaining bits, respectively, of the D partial product. Then extending the sign of SX to the full number of bits in the final sum yields SSS . . . SSSX. An alternative expression of SSS . . . SSSSX is the sum

```
    1111 ... 111CX
+                1
  ─────────────────
    SSSS ... SSSSX
``` where C is the complement of S. Now if the sign extension word for sin(−B) has a least significant bit aligned with the sign bit of SY., then the sign extension word may be written as the sum

```
          sew
+           1
  ─────────────
   sign ext word
``` where sew is the one's complement of the signs of the other partial products. Thus adding the D partial product and the sign extension word is the same as the following sum:

```
            sew
              1
    1111 ... 111CX
+                1
``` and this simplifies to the sum

```
       sew
+       CX
```

The second case of the LSB of the sign extension word for sin(−B) aligning one bit to the left of the sign bit of the D partial product also has the sum of the D partial product and the sign extension word of sin(−B) expressable as a sum:

```
           sew
             1
    1111 ... 111CX
+                1
``` and this simplifies to

```
       sew
+      CSX
```

Thus the sign extension for the D partial product and the sign extension word for sin(−B) can be combined to simplify the sum.

Recoding the sin(−B) multiplier in pairs of bits implies that the least significant bit of the sign extension word is shared with the most significant bit of the least significant partial product. When the least significant recoded partial product multiplier is 0, 1, or −1, the least significant bit of the sign extension word represents the complement of the sign of that partial product. When the least significant partial product multiplier is 2 or −2, the least significant bit of the sign extension word represents the most significant bit of that partial product. In tabular form:

| Multiplicand Sign | Least significant partial product multiplier value | Sign Extension Word least significant bit | N | M |
|---|---|---|---|---|
| 0 | 0 | 1 | 0 | 0 |
| 1 | 0 | 1 | 0 | 0 |
| 0 | 1 | 1 | 0 | 1 |
| 1 | 1 | 0 | 0 | 1 |
| 0 | −1 | 0 | 1 | 0 |
| 1 | −1 | 1 | 1 | 0 |
| 0 | 2 | 0 | 1 | 0 |
| 1 | 2 | 1 | 1 | 0 |
| 0 | −2 | 1 | 0 | 1 |
| 1 | −2 | 0 | 0 | 1 |

Figure 10:
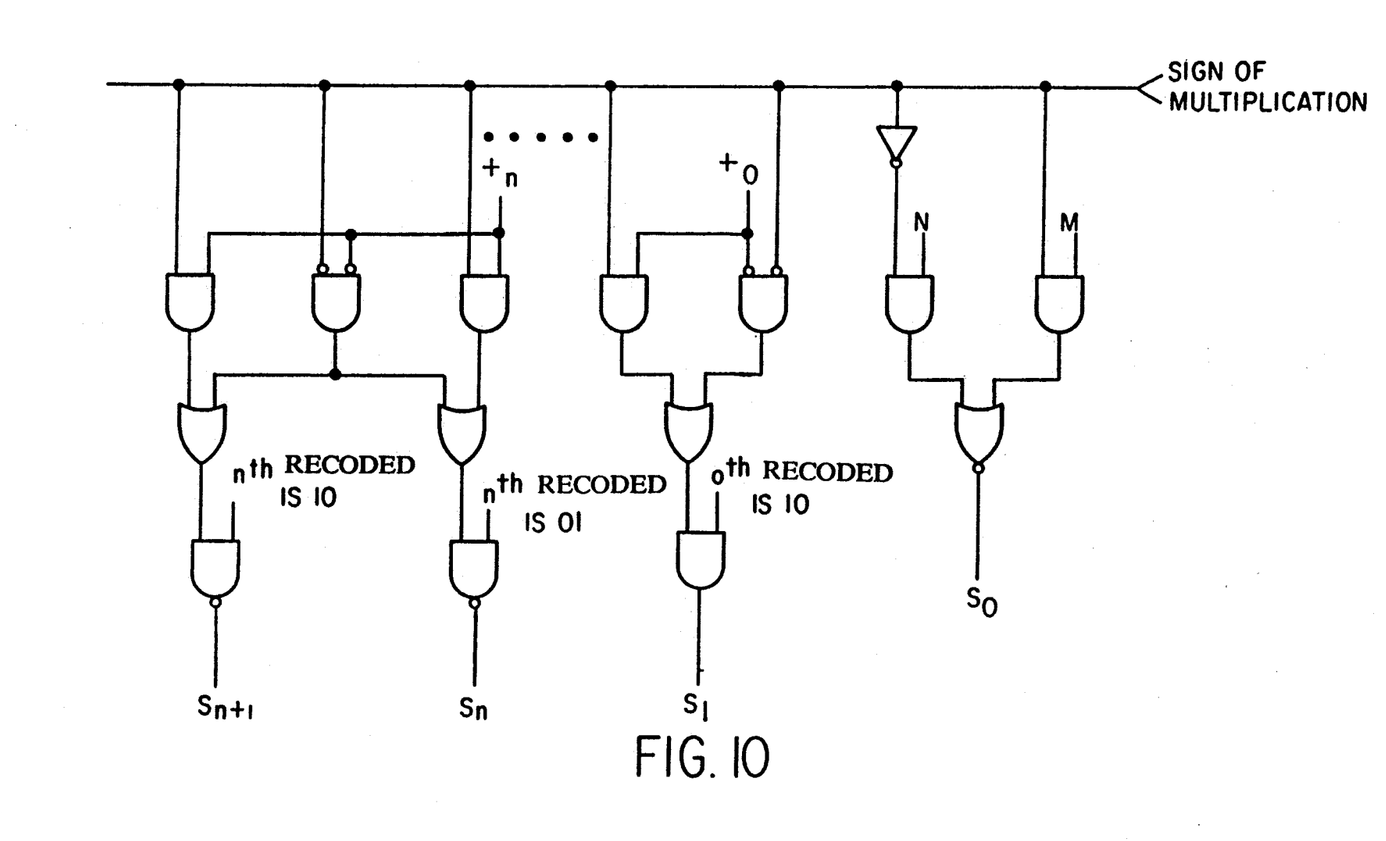
FIG. 10 shows a sign extension word logic.

Thus the Sign Extension Word LSB is 0 when the multiplicand is negative and the least significant partial product multiplier value is 1 or −2 or when the multiplicand is positive and the multiplier is −1 or 2. Let N and M be defined as in the table and be stored in the fine sine ROM for the least significant partial product multiplier. Thus N is 1 when the least significant partial product's multiplier is −1 or 2 and M equal 1 when the least significant partial product's multiplier is 1 or −2. Using these signals, FIG. 10 shows logic for sign extension computation where $S_n$, is the nth bit of the sign extension word and $+_n$ is the "+" for the nth recoded bit pair. This logic computes the sign extension word in an efficient manner.

Scaling

FIG. 2 shows input data samples x(n) multiplying the output of the sin/cos generator as part of the down conversion. The data samples and the sin/cos generator output typically will have two's complement format, and thus the multiplication of −1 from the sin/cos generator with a frill scale negative data sample may arise and cause an overflow. Sin/cos generator 300 avoids the overflow possibility by scaling its output by a factor slightly less than 1. The effect of this scaling can be undone as part of the filtering which follows the multiplication in FIG. 2. In particular, sin/cos generator 300 stores the coarse angle sines and cosines in scaled form. Indeed, the coarse cosine ROM stored values are generated using the formula:

$$\text{Round}\{2^{18}(1-2^{-17}-2^{-18})\cos(\pi[\text{Coarse Phase Count}]/2^9)\}/2^{18}$$

where Coarse Phase Count is the number in the range 0 to 255 corresponding to the 8-bit coarse phase as a binary number. The scale factor $1-2^{-17}-2^{-18}$ insures proper results when final rounding to 17 bits two's complement format occurs in the sum of products computation of sin(A+B) and cos(A+B). Similarly, the coarse sine ROM stored values derive from:

$$\text{Round}\{2^{18}(1-2^{-17}-2^{-18})\sin(\pi[\text{Coarse Phase Count}]/2^9)\}/2^{18}$$

Note that the coarse sine and coarse cosine must be represented to 18 bits.

Multiplexer Location

FIG. 3 illustrates the location of multiplexers 315-316 as between ROMs 311-312 and registers 321-322 and, similarly, the location of multiplexers 335-336 as between ROM 331 and register 341. In fact, the multiplexers are essentially located at the ROM sense amplifiers and avoid the time delay of multiplexer location downstream of the registers. The ROMs use a sense amplifier with sufficient drive to set the registers.

Second Preferred Embodiment

Figures 8, 8A:
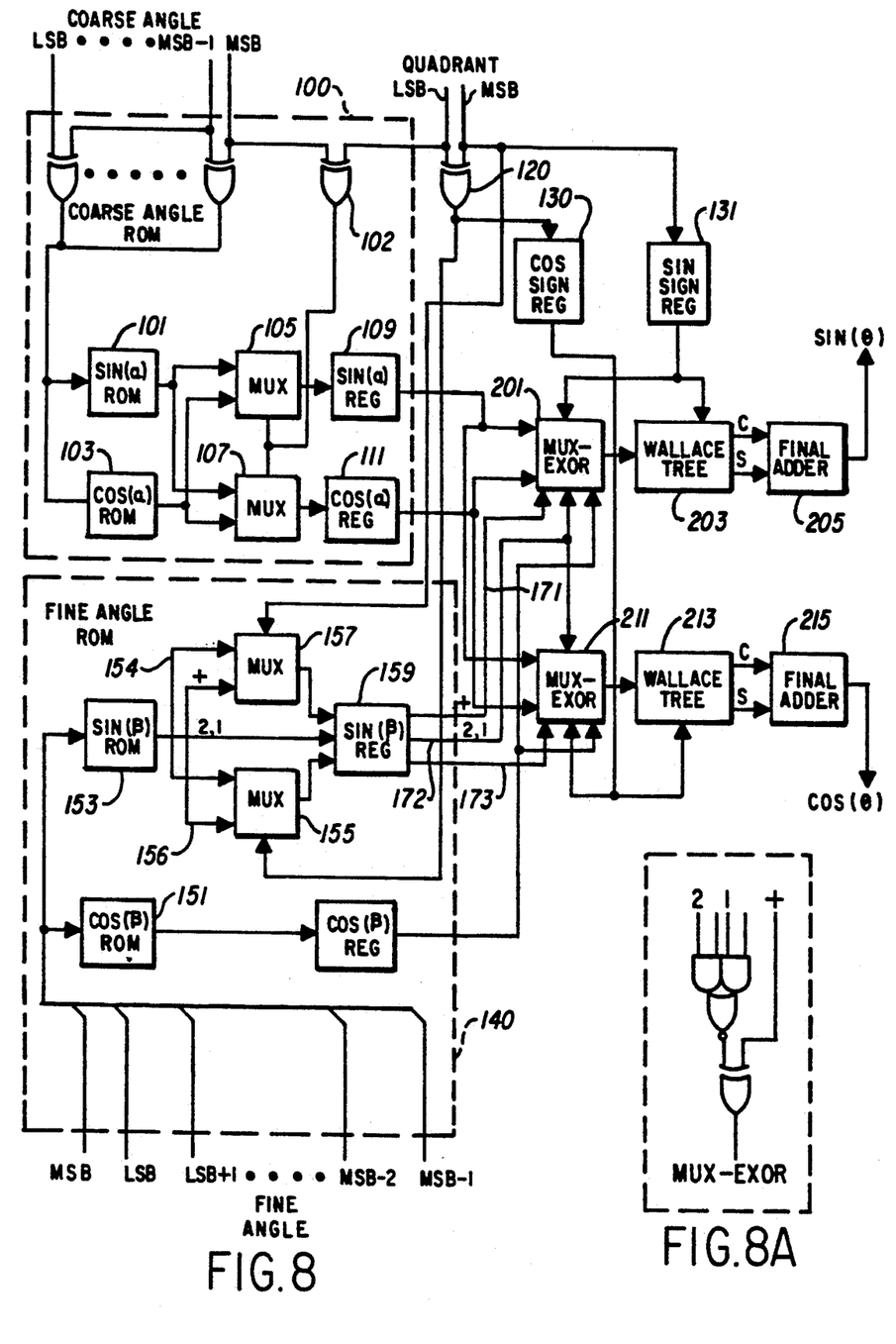
FIG. 8 illustrates second preferred embodiment sin/cos generator in block form.

FIG. 8 illustrates a second preferred embodiment sin/cos generator 800 which duplicates much of the circuitry of sin/cos generator 300. However, sin/cos generator 800 stores sines and cosines of only nonnegative fine angles. This implies increase in ROM size because the symmetry of the fine angle about 0 will not be exploited and the cosine approximation worsens by a factor of about 4, but this also permits a simplification of the hardware related to the fine ROMs as is apparent in FIG. 8. Again using the 8-bit coarse and 8-bit fine phase example, the fine phase encodes fine angles as follows.

| 8-bit Fine Phase | Fine Angle |
|---|---|
| 0000 0000 | 0 |
| 0000 0001 | $\pi/2^{17}$ |
| 0000 0010 | $2\pi/2^{17}$ |
| ... | ... |
| 0111 1111 | $(2^7-1)\pi/2^{17}$ |
| 1000 0000 | $\pi/2^{10}$ |
| 1000 0001 | $(2^7+1)\pi/2^{17}$ |
| ... | ... |
| 1111 1101 | $(2^8-3)\pi/2^{17}$ |
| 1111 1110 | $(2^8-2)\pi/2^{17}$ |
| 1111 1111 | $(2^8-1)\pi/2^{17}$ |

Because the coarse angles are offset and centered in the coarse intervals, the 18-bit phase 000 ... 00 word no longer encodes the angle 0. Rather it encodes the coarse angle offset, $\pi/2^{10}$. Thus to align the input phase with the angle encoded, 00 0000 0000 1000 0000 is subtracted from the input phase word.

Sin/cos generator 800 operates as follows. As with sin/cos generator 300, the the two quadrant bits determine signs (COS(A) SIGN REG and SIN(A) SIGN REG), selection between "+" and "−" recoding of the fine sines, and the quadrant LSB determines coarse angle sine/cosine interchange for quadrant changes (XOR gate 102). In fact, nonnegative fine angles implies that the fine phase MSB is used to address the fine angle ROM, and the quadrant bits directly control MUX 155 and MUX 157. See FIG. 8. The coarse angle encoding for sin/cos generator 800 duplicates that of sin/cos generator 300, and MUX 105 plus MUX 107 again provide the sine/cosine interchange for complementary angles. Sin/cos generator 800 contains the same multiplexer-exclusive NOR arrays and Wallace trees as sin/cos generator 300. The fine angle ROM in sin/cos generator 800 is twice the size of the fine angle ROM in sin/cos generator 300, but it eliminates the two's complement addressing circuitry and its associated delay. The delay reduction means less address setup time is required.

The coarse angles and the fine angles include 0, so there is the possibility of a multiplication of −1 times −1 in the multipliers which will cause an overflow for numbers in two's complement format unless an extra bit is used. The overflow can also be avoided by either employing saturation logic or by scaling the coarse sines and cosines by a factor such as $1-2^{-17}-2^{-18}$ which can be compensated for subsequently in the system. Thus the recoded fine sine and cosines remain the same.

Third Preferred Embodiment

The third preferred embodiment sin/cos generator is similar to the second preferred embodiment but with the coarse angles at the lower endpoints of the coarse intervals. That is, the coarse phase encodes coarse angles as follows.

| 8-bit Coarse Phase | Coarse Angle |
|---|---|
| 0000 0000 | 0 |
| 0000 0001 | $\pi/2^9$ |
| 0000 0010 | $2\pi/2^9$ |
| ... | ... |
| 0111 1111 | $(2^7-1)\pi/2^9$ |
| 1000 0000 | $\pi/4$ |
| 1000 0001 | $(2^7+1)\pi/2^9$ |
| ... | ... |
| 1111 1101 | $(2^8-3)\pi/2^9$ |
| 1111 1110 | $(2^8-2)\pi/2^9$ |

| -continued | |
|---|---|
| 8-bit Coarse Phase | Coarse Angle |
| 1111 1111 | $(2^8 - 1)\pi/2^9$ |

The coarse angles are again symmetric about $\pi/4$, but the two's complement of a coarse phase encodes the complement of the angle, except for angle 0. And angle $\pi/4$ is encoded by a two's complement invariant address. The storing only of coarse sines and cosines up to $\pi/4$ can again be coupled with the interchange of sine/cosine to cover the entire first quadrant. Rather than a one's complement on the address a two's complement driven by the coarse phase MSB is required. With fine angles encoded as in the second preferred embodiment, the phase 000 . . . 000 encodes the angle 0.

The coarse angles and the fine angles both include 0, so there is the possibility of a multiplication of $-1$ times $-1$ which will cause an overflow for numbers in two's complement format unless an extra bit is used. The overflow can also be avoided by either employing saturation logic or by scaling the coarse sines and cosines by a factor such as $1-2^{-17}-2^{-18}$ which can be compensated for subsequently in the system. Thus the recoded fine sine and cosines remain the same.

Fourth Preferred Embodiment

The fourth preferred embodiment is again similar to the first preferred embodiment in that the coarse angles are symmetrical about $\pi/4$ plus centered in the coarse intervals and the fine angles are symmetric about 0. However, in the fourth preferred embodiment the number of coarse intervals is not a power of 2. This requires a change in the phase generation but not in the sin/cos generator hardware.

For example, if a quadrant were divided into 1000 coarse intervals and each coarse interval divided into 100 fine intervals, then 10-bit coarse phase and 7-bit fine phase will be required. The phase generator could count up to 100 and then reset the fine phase count and increment the coarse phase count. When the coarse phase count reaches 1000, the phase generator resets the coarse phase count and increments the quadrant count. The fine and coarse ROMs will have 7-bit and 10-bit addresses, but symmetry of the storage will be more involved in general. However, an address symmetric phase could be used and thereby permit the phase to be the address and thus use the same address complementers as in sin/cos generator 300. In particular, the fine phase count could start at 0001110 (14) and count to 1110001 (113) and then reset plus increment the coarse phase count. This preserves the two's complement of a fine address correspondence to the negative of the encoded angle. 0001110 encodes the largest magnitude negative fine angle. Similarly, the coarse phase count could start at 00000 01100 (12) and count to 11111 10011 (1011) with one's complement of the phase corresponding to the address of the coarse angle symmetry about $\pi/4$.

The coarse angles and the fine angles both include 0, so there is the possibility of a multiplication of $-1$ times $-1$ which will cause an overflow for numbers in two's complement format unless an extra bit is used. The overflow can also be avoided by either employing saturation logic or by scaling the coarse sines and cosines by a factor such as $1-2^{-17}-2^{-18}$ which can be compensated for subsequently in the system. Thus the recoded fine sine and cosines remain the same.

FURTHER MODIFICATIONS AND VARIATIONS

The preferred embodiments may be modified in many ways while retaining one of more of the features of symmetrical coarse angles about $\pi/4$, symmetrical fine angles about 0, and storing recoded fine angle sines and cosines to provide multiplier controls for the multiplier/adders used to compute the output sine and cosine values.

For example, the coarse interval size, the number of coarse and fine angles, the input phase word size, and the output precision could all be separately varied; this would change the number and sizes of the ROMS, especially if the coarse intervals were of nonuniform sizes. Further, the use of fine ROM shown in FIG. 3 could be a full size ROM thus eliminating the delay associated with computing the two's complement of the input address and its associated circuitry.

What is claimed is:

1. A sin/cos generator, comprising:
   (a) a coarse memory storing sines and cosines of coarse angles with said coarse angles within the first octant;
   (b) a fine memory storing sines and cosines of fine angles with the magnitudes of said fine angles within the difference between successive coarse angles;
   (c) a phase input decoder, said decoder decoding an input phase to yield a coarse memory address and a fine memory address; and
   (d) arithmetic circuitry coupling said first and second memories with addition, multiplication, and sign circuitry whereby the sine and cosine of an angle encoded by said input phase is computed using the trigonometric formulas $\sin(A+B)=\sin(A)\cos(B)+\cos(A)\sin(B)$ and $\cos(A+B)=\cos(A)\cos(B)-\sin(A)\sin(B)$.

2. The sin/cos generator of claim 1, wherein:
   (a) said decoder partitions an input phase of $2+N+M$ bits into 2 quadrant bits, N coarse phase bits, and M fine phase bits; and
   (b) when said N coarse phase bits encode a coarse angle in the second octant, said decoder one's complements the least significant $N-1$ bits of said N coarse phase bits to provide an address for said coarse memory which encodes a complementary angle in the first octant.

3. The sin/cos generator of claim 2, wherein:
   (a) said fine angles include both positive and negative angles; and
   (b) said fine memory stores sines and cosines of only nonpositive fine angles.

4. The sin/cos generator of claim 3, wherein:
   (a) when said M fine phase bits encode a positive fine angle, said decoder two's complements said M fine phase bits to provide an address for said fine memory which encodes a negative angle.

5. The sin/cos generator of claim 4, wherein:
   (a) the default address of said fine memory stores the sine of one fine angle, and all other fine angles are in symmetric pairs.

6. The sin/cos generator of claim 4, wherein:
   (a) said 2 quadrant bits, the MSB of said N coarse phase bits, and the MSB of said M fine phase bits determine signs and sine-cosine exchanges used in said trigonometric formulas.

7. The sin/cos generator of claim 2, wherein:
(a) N equals 8; and
(b) M equals 8.

8. The sin/cos generator of claim 2, wherein:
(a) said fine angles includes only nonnegative angles.

9. The sin/cos generator of claim 1, wherein:
(a) said arithmetic circuitry includes a multiplier using a recoded input and Wallace tree plus final adder for addition of partial products; and
(b) said fine sines are stored in recoded format in said fine memory.

10. The sin/cos generator of claim 9, wherein:
(a) said recoded format is bit pairwise recoding as follows:

| Original Bit Pair | Carry in | Original next more significant | Recoded Bit Pair | Carry out | "+" | "−" |
|---|---|---|---|---|---|---|
| 00 | 0 | ** | 00 | 0 | 0 | 0 |
| 00 | 1 | ** | 01 | 0 | 0 | 1 |
| 01 | 0 | ** | 01 | 0 | 0 | 1 |
| 01 | 1 | ** | 10 | 0 | 0 | 1 |
| 10 | 0 | *0/0* | 10 | 0 | 0 | 1 |
| 10 | 0 | 11 | 10 | 1 | 1 | 0 |
| 10 | 1 | ** | 01 | 1 | 1 | 0 |
| 11 | 0 | ** | 01 | 1 | 1 | 0 |
| 11 | 1 | ** | 00 | 1 | 0 | 0. |

11. The sin/cos generator of claim 10, wherein:
(a) said arithmetic circuitry has multiplexers for partial product insertion into said Wallace trees which each include: a first AND gate with inputs the MSB of the recoded bit pair and the N−1 bit of the multiplicand, a second AND gate with inputs the LSB of the recoded bit pair and the N bit of the multiplicand, a NOR gate with inputs connected to the outputs of said first and second AND gates, and an exclusive NOR gate with inputs connected to the output of said NOR gate and the "+" associated with the recoded bit pair.

12. The sin/cos generator of claim 11, wherein:
a) said arithmetic circuitry has sign extension word circuitry with the bits $S_j$ of the sign extension word output by: for $S_0$ the NOR of (i) the AND of signal "M" and the sign of the multiplicand and (ii) the AND of signal "N" and the complement of the sign of the multiplicand with "N" and "M" as in the following table; for $S_1$ the NAND of (i) 0th recoded bit pair is 10 and (ii) the OR of (a) the AND of the signal "+" for the 0th recoded bit pair and the sign of the multiplicand and (b) the NOR of the signal "+" for the 0th recoded bit pair and the sign of the multiplicand; for $S_n$ the NAND of (i) nth recoded bit pair is 01 and (ii) the OR of (a) the AND of the signal "+" for the nth recoded bit pair and the sign of the multiplicand and (b) the NOR of the signal "+" for the nth recoded bit pair and the sign of the multiplicand; for $S_{n+1}$ the NAND of (i) nth recoded bit pair is 10 and (ii) the OR of (a) the AND of the signal "+" for the nth recoded bit pair and the sign of the multiplicand and (b) the NOR of the signal "+" for the nth recoded bit pair and the sign of the multiplicand; and
(b) the the "N" and "M" signals are as follows and stored with the least significant partial product multiplier:

| Multiplicand Sign | Least significant partial product multiplier value | Sign Extension Word least significant bit | N | M |
|---|---|---|---|---|
| 0 | 0 | 1 | 0 | 0 |
| 1 | 0 | 1 | 0 | 0 |
| 0 | 1 | 1 | 0 | 1 |
| 1 | 1 | 0 | 0 | 1 |
| 0 | −1 | 0 | 1 | 0 |
| 1 | −1 | 1 | 1 | 0 |
| 0 | 2 | 0 | 1 | 0 |
| 1 | 2 | 1 | 1 | 0 |
| 0 | −2 | 1 | 0 | 1 |
| 1 | −2 | 0 | 0 | 1. |

13. A method of generating the sine and cosine of an angle, comprising the steps of:
(a) partitioning an input angle into an input quadrant indicator, an input coarse angle, and an input fine angle where said input coarse angle is one of a plurality of coarse angles located in the first quadrant and said input fine angle is one of a plurality of fine angles located in a range of extent equal to the difference between successive coarse angles;
(b) providing a first lookup table of sines and cosines of coarse angles for coarse angles in the first octant;
(c) using said first lookup table to find the sine and cosine of said input coarse angle, and when said input coarse angle is in the second octant its complementary angle is used in said first lookup table;
(d) providing a second lookup table of sines and cosines of fine angles;
(e) using said second lookup table to find the sine and cosine of said input fine angle; and
(f) combining said sine and cosine of said input coarse angle and said sine and cosine of said fine angle according to said quadrant indicator to yield the sine of said input angle.

14. The method of claim 13, wherein:
said fine angles include both positive and negative angles and said second lookup table contains only sines and cosines of nonpositive fine angle, and when said input fine angle is positive its true's complement is used in said second lookup table.

15. The method of claim 13, wherein:
said fine angles are nonnegative.

16. The method of claim 15, wherein:
said input angle is encoded as a 2+N+M bit phase, and the 2 most significant bits form said quadrant indicator, the N next most significant bits encode said coarse angle, and the M least significant bits encode the fine angle, and said N bits provide addressing for said first lookup table and said M bits provide addressing for said second lookup table.

* * * * *